Patented Nov. 16, 1937

2,098,964

UNITED STATES PATENT OFFICE 2,098,964

ARTIFICIAL RESINS

Rolwand Hill and Eric Everard Walker, Blackley, Manchester, England, assignors to Imperial Chemical Industries Limited, London, England No Drawing. Application October 31, 1928, Serial No. 316,346. In Great Britain, November 11, 1927

8 Claims. (Cl. 260—8)

It is well known that resins may be produced by the interaction of phthalic anhydride with a polyhydric alcohol. (We include in the term "polyhydric alcohols" throughout this specification all those alcohols which contain two or more alcoholic hydroxyl groups in the molecule.) Also it is well known that the properties of these resins may be varied by substituting for the whole or part of the phthalic anhydride some other poly-basic acid (or its anhydride) such as citric acid, tartaric acid, maleic acid or fumaric acid. Further, part of the poly-basic acid (or its anhydride) may be replaced by mono-basic acids such as butyric acid, stearic acid, or the acids of castor or linseed oil.

By the term "organic polybasic acid composition", as used herein, we mean a composition containing one or more organic polybasic acids or their anhydrides, either alone or partially condensed.

In the prior art a single polyhydric alcohol, either a glycol or a glycerin, is used. We have found that better results are obtained by using at least two alcohols and that it is advantageous to use together alcohols of different order; that is a mixture of organic bodies at least two of which have a different number of alcohol groups in the molecule.

Even the relatively cheap monohydric alcohols may be employed as useful constituents of resins of this type. The properties of these resins may be varied within wide limits by using mixed alcohols of different order instead of a single polyhydric alcohol. We have found that the substitution of a mixture of alcohols (provided that one at least of the alcohols contains two or more alcoholic hydroxyl groups) for the single polyhydric alcohol ordinarily used produces important changes in the stability, rate of hardening, solubility and other properties of the resin. Thus, for instance, ordinary glycerol-phthalic anhydride resins are very sparingly soluble in ester solvents, but if part of the glycerol is replaced by cyclohexanol a resin is produced which is readily soluble in ethyl and butyl acetates, and which is of special value as a constituent of nitrocellulose lacquers. It is clear that the properties of the resins obtained from every possible mixture of monohydric and polyhydric alcohols cannot be scheduled, but the examples shown how resins with a variety of different properties may be obtained by means of this invention. It is not necessary that one of the polyhydric alcohols should be glycerol but two or more polyhydric alcohols may be employed. It is necessary, however, that one of the alcohols present should be polyhydric.

By the use of the processes hitherto disclosed it is difficult to obtain a resin of low acid value and of high solubility. If, however, part of the polyhydric alcohol ordinarily employed is replaced by another alcohol, e. g. by butyl alcohol, the mix may be heated long enough to reduce the acid value to a much lower figure without forming a gel or becoming so sparingly soluble as to be useless for the purpose of making lacquers. We find that this property of reducing the tendency to gel formation is possessed by organic bodies having up to two alcohol groups in the molecule, in general, in which term we include not only the simple aliphatic, aromatic-aliphatic, and alicyclic alcohols, such as methyl alcohol, benzyl alcohol, cyclohexanol, and their homologues, and glycols such as ethylene glycol and trimethylene glycol, but also derivatives of di-, tri- and other polyhydric alcohols in which all but one, or all but two, of the alcoholic groups have been converted into ether or ester groups; examples of the latter are glycol monoalkyl ethers, glycol monoacetate, glycerol mono- and di-acetates, chlorohydrins of glycol or glycerol, partly acylated mannitol and other hexahydric or pentahydric alcohols or mixtures thereof. Even derivatives of glucose may be used, but here we prefer to cover the aldehyde group by converting it into a glucoside, as e. g. in partly acetylated methyl glucoside.

Our invention may be carried out in a variety of ways. For example, all the components, namely, the phthalic anhydride, the polyhydric alcohol, and another alcohol or alcohols, may be mixed together and heated under a reflux condenser (water-cooled for the more volatile alcohols) until the more volatile alcohol has reacted; the temperature may then be raised and the reaction continued at a higher temperature. Alternatively, one alcohol (preferably the more volatile one) is caused to react with excess of phthalic anhydride first and the other is then added. A third method is to start with a half ester of phthalic acid and cause it to interact with glycerol. A fourth method, which is only applicable when glycerol is used in conjunction with a glycol (or another polyhydric alcohol) is to prepare two resins, for example, a glycol-phthalic anhydride resin and a glycerol-phthalic anhydride resin and then to melt these together, whereby a new resin is formed which may or may not require further heating, but which in any case possesses properties which cannot be foretold from those of the constituents.

Esters such as dibutyl phthalate and ethyl lactate have been proposed for incorporation with polyhydric alcohol-polybasic acid resins but the action of such materials was that of a plasticizer in so much as it was claimed that more flexible resins would be produced. Similarly, glycol diacetate has been added for a similar purpose. But the action of these materials is quite different from that of the alcohol itself or of the half esters of phthalic acid.

The resins described in this specification are particularly suitable for lacquers since many of them may be prepared in a highly soluble non-tacky form with acid values as low as 1 to 7.

Many of these resins may be hardened by prolonged heating at a temperature of 80° to 100° C. followed by heat treatment at higher temperatures. Like other resins of this class, they may be mixed with fillers and used as moulding powders and hardened by heat with or without catalysts. The resins may be modified further by substituting other poly-basic acids (or their anhydrides) for phthalic anhydride, and by substituting mono-basic acids such as butyric acid, stearic acid or the acids of linseed oil, castor oil and tung oil for part of the phthalic anhydride (or other poly-basic acid). They may be rendered softer and more pliable by the addition of high boiling solvents as plasticizers.

Our invention is illustrated, but not limited, by the following examples, in which the parts are by weight.

EXAMPLE 1

*A typical example of a phthalic anhydride-glycerol-ethylene-glycol resin*

A mixture of 370 parts of phthalic anhydride, 250 parts of glycerol, 50 parts of ethylene glycol are heated in a vessel, fitted with a short air reflux condenser, so as to allow water to escape, yet retain the higher boiling constituents. At 100° C. the materials form a uniform fusion; the temperature is then increased to 180–190° C. with stirring. After the mixture has been maintained for one hour at this temperature, it is raised to 200–210° C. when there is brisk evolution of steam. The removal of the latter, and the consequent hastening of the reaction in the later stages, is much facilitated by the continual passage of a stream of carbon dioxide. The heating is continued for a further 4 hours at this temperature, i. e. 5 hours in all.

The resulting product on cooling is a transparent, brittle and hard resin. It is readily soluble in acetone, and in a mixture of benzene and alcohol. A resin prepared in this manner is characterized by a low acid value (2.7 in the above example). The product begins to sinter at 47–49° C. and a clear meniscus is formed at 64–66° C.

EXAMPLE 2

*A typical example of the blending of two different polyhydric alcohol resins*

Instead of carrying out the formation of a glycerol-glycol-phthalic anhydride resin in one stage, the constituent resins may be prepared individually, and then blended with advantageous results. By varying the proportion of the constituents in the blend, resins with a wide range of properties may be obtained quite readily.

(a) *Glycol-phthalic anhydride resin.*—A mixture of 222 parts of phthalic anhydride and 92 parts of ethylene glycol are heated in a suitable vessel, fitted with a short air condenser which will allow of the escape of water, and yet retain other volatile constituents. The mixture fuses to a homogeneous mass at 100° C. and the temperature is then raised and maintained at 185–195° C. for 2½ hours. A current of carbon dioxide is passed through the melt after this period to facilitate the removal of water formed during the reaction, and the temperature raised to 205–215° C. for a further 2 hours. Finally, (i. e. after 4½ hours), the temperature is raised to 235–240° C. for one hour. It is advisable to employ a mild stirring action throughout the course of the preparation.

The resulting product on cooling forms a transparent resin of extreme hardness. The acid value is of a low order (3.5 in the above example). The solubility in acetone is moderate, and in benzene-alcohol mixture is poor. When heated it begins to soften at 54–56° C. and forms a clear meniscus at 68–70° C.

(b) *Glycerol-phthalic anhydride resin.*—A mixture of 148 parts of phthalic anhydride and 120 parts of glycerol is melted in a suitable vessel fitted with a short air reflux, and the temperature raised to 185–195° C. for one hour. A current of carbon dioxide is then passed, and the temperature raised to 200–210° C. It is maintained at this temperature for 2 hours, when the reaction is stopped.

In this manner, a transparent resin is formed, which whilst being brittle and non-flexible, is decidedly "tacky". It is of good solubility in acetone, and in benzene alcohol mixture, and is characterized by a low acid value (i. e. 7.6 in the quoted example).

(c) *Blending.*—Equal weights of resin "a" and resin "b" are heated together and the temperature raised to 210° C. when the mix is thoroughly mobile; it is then stirred for 5 minutes and allowed to cool. The blended resin possesses the hardness and freedom from tackiness of resin "a" but is more soluble. It begins to sinter at about 51° C. and forms a clear meniscus at about 67° C.

EXAMPLE 3

*A typical example of a glycerol-acid alkyl phthalate resin*

A mixture of acid butyl phthalate (66 parts) and glycerol (15 parts) is melted in a vessel fitted with a short air reflux condenser which will allow of the escape of water, and the temperature of the melt raised to 200–210° C. There is brisk evolution of steam, and as the reaction proceeds there is a gradual thickening of the liquid. After 2½ hours a stream of carbon dioxide is passed to assist in the removal of the water formed during the condensation, and after a further hour the reaction is stopped.

The product is a transparent, hard, non-flexible resin soluble in acetone and benzene-alcohol mixture. When heated it sinters at 47–50° C. and forms a clear meniscus at 66–68° C. A mixture of dibutylphthalate, phthalic anhydride and glycerol in equivalent proportions yields an entirely different product.

It is thus apparent that the acid butyl phthalate does not act as "plasticizer" but actually interacts with the glycerol or glycol present to form a hard tough resin.

EXAMPLE 4

*A typical example of a phthalic anhydride-glycerol-butyl alcohol resin*

18.5 parts of butyl alcohol and 74 parts of phthalic anhydride are heated to 200–210° C. for one hour under air reflux, and the resulting melt is then allowed to cool and 23 parts of glycerol added. The temperature is then increased and maintained at 185–195° C. for 4 hours, a current of carbon dioxide being passed, as in other examples. After this period, the product on cooling is tough and hard, and has an acid value of 48. It is moderately soluble in acetone and in benzene alcohol mixture. Alternatively, the reaction may be interrupted at an earlier stage, and a product of superior solubility so obtained; in this case, however, the acid value is higher. The butyl alcohol may be recovered by hydrolysis from the resin so formed.

If the butyl alcohol in the above example be replaced by the equivalent of glycerol (i. e. 31 parts in all) then "gel" formation takes place after 3 hours, the acid value immediately preceding this being 93.

EXAMPLE 5

*A typical example of a glycerol-phthalic anhydride-cyclohexanol resin*

A mixture of 74 parts of phthalic anhydride, 25 parts of cyclohexanol and 23.5 parts of glycerol are heated in a vessel fitted with a short air reflux condenser to a temperature of 170° C. for one hour. The temperature is then raised and maintained at 185–195° C., and a current of carbon dioxide is passed through to facilitate removal of water, and to blow out excess of phthalic anhydride. There is a brisk evolution of water, and as the reaction proceeds, the melt becomes more viscous. At this stage, the reflux may be dispensed with, and the reaction completed in the open vessel. After 3 hours the liquid is very viscous, and the heating is then discontinued.

The resulting resin is hard and tough. It is of good solubility in acetone and in benzene alcohol mixture. It is differentiated from ordinary phthalic anhydride glycerol resins (which are virtually insoluble in ester solvents) by its excellent solubility in ethyl acetate, amyl acetate and other ester solvents. It may be used as a constituent of nitrocellulose lacquers, and gives clear transparent films.

EXAMPLE 6

A mixture of 92 parts of phthalic anhydride, 23 parts of glycerol and 23 parts of glycol are heated in an open flask to 185° C. and 36 parts of linseed oil fatty acids are added slowly from a dropping funnel when the temperature drops to 160–165° C. The temperature is then raised and maintained at 185° C. for 30 minutes when emulsification is complete. A stream of carbon dioxide may then be passed through the melt. The temperature is raised to 230–240° C. and after maintaining at this temperature for a further 3 hours the reaction is stopped. The resulting product possesses a good solubility in acetone, and in benzene-alcohol mixture and has an acid value of 2.0. It is characterized by being extremely flexible without being "tacky" and consequently may be used as a lacquer for coating of flexible articles, etc.

When the above reaction is carried out under similar conditions replacing the glycol by the equivalent quantity of glycerol (i. e. 46 parts of glycerol in all), the melt after heating for 30 minutes at a temperature of 230–240° C. "gels" to an insoluble vesiculated mass, useless for incorporation in lacquers. Immediately preceding "gel" formation the resin has an acid value of 35, but does not possess so good a solubility as the example quoted above.

The above example thus shows that the use of equal parts of glycerol and glycol in place of glycerol alone has the advantage of giving a resin which (1) is stable instead of being liable to gel, (2) has a low acid value (2 instead of 35), and (3) has improved solubility.

What we claim and desire to secure by Letters Patent is:—

1. In the manufacture of polyhydric alcohol-polybasic acid resins, the process which comprises condensing together the mono-ester of an organic polybasic acid composition and at least one polyhydric alcohol.

2. An alkyd resin convertible by heat to the infusible state consisting of the esterification product of a polybasic acid component and a mixture of polyhydric alcohols, one of which is a dihydric alcohol.

3. A resin convertible by heat to the infusible state consisting of the condensation product of a polybasic acid component, a major part of trihydric alcohol and a minor part of dihydric alcohol.

4. An alkyd resin convertible by heat to the infusible state consisting of the product of esterification of a polybasic organic acid, a trihydric alcohol and a dihydric alcohol.

5. An alkyd resin convertible by heat to the infusible state consisting of the product of esterification of phthalic anhydride, glycerine and glycol.

6. An alkyd resin convertible by heat to the infusible state consisting of the product of esterification of a polybasic organic acid, a trihydric alcohol and dietheylene glycol.

7. An alkyd resin convertible by heat to the infusible state consisting of the product of esterification of a polybasic organic acid, a trihydric alcohol, a dihydric alcohol and a fatty acid of a drying oil.

8. An alkyd resin convertible by heat to the infusible state consisting of the product of esterification of phthalic anhydride, glycerine, glycol and fatty acid derived from linseed oil.

ROWLAND HILL.
ERIC EVERARD WALKER.

CERTIFICATE OF CORRECTION.

Patent No. 2,098,964.  November 16, 1937.

ROWLAND HILL, ET AL.

It is hereby certified that error appears in the printed specification of the above numbered patent requiring correction as follows: In the heading to the printed specification, line 3, name of first inventor, for "Rolwand Hill" read Rowland Hill; page 1, first column, line 51, for "shown" read show; and that the said Letters Patent should be read with these corrections therein that the same may conform to the record of the case in the Patent Office.

Signed and sealed this 1st day of March, A. D. 1938.

Henry Van Arsdale,
Acting Commissioner of Patents.

(Seal)